United States Patent [19]

Stevenson

[11] 4,091,899
[45] May 30, 1978

[54] LOCK-UP CONVERTER CLUTCH WITH CENTRIFUGAL CONTROL VALVES

[75] Inventor: Paul D. Stevenson, Ann Arbor, Mich.

[73] Assignee: General Motors Corporation, Detroit, Mich.

[21] Appl. No.: 788,243

[22] Filed: Apr. 18, 1977

[51] Int. Cl.² .................. F16D 43/284; F16H 41/18
[52] U.S. Cl. .................. 192/3.3; 192/103 FA; 192/41 R
[58] Field of Search .............. 192/3.3, 3.29, 3.31, 192/103 FA

[56] References Cited

U.S. PATENT DOCUMENTS

| | | | |
|---|---|---|---|
| 2,404,657 | 7/1946 | Roberts et al. | 192/3.29 |
| 3,390,594 | 7/1968 | Gillespie | 192/3.31 |
| 3,410,378 | 11/1968 | Maurice | 192/103 FA X |
| 3,693,478 | 9/1972 | Malloy | 192/3.3 |

*Primary Examiner*—Benjamin W. Wyche
*Attorney, Agent, or Firm*—Donald F. Scherer

[57] ABSTRACT

A torque converter and lock-up clutch in which a single plate fluid operated clutch is disposed between the turbine and the input shell of the torque converter. The clutch engagement chamber is formed between the turbine and the clutch plate while a clutch disengagement chamber is formed between the input shell and the clutch plate. A normally open centrifugally responsive valve is mounted on the clutch and provides a controlled flow path between the engagement and disengagement chambers in response to clutch speed thereby controlling the pressure differential between the chambers when the clutch speed is less than a predetermined value. A normally closed centrifugally responsive valve is mounted on the clutch and provides a controlled flow path between the engagement and disengagement chambers in response to the speed of the clutch, thereby controlling the engagement force of the clutch when the speed of the clutch is equal to or greater than the predetermined speed.

2 Claims, 4 Drawing Figures

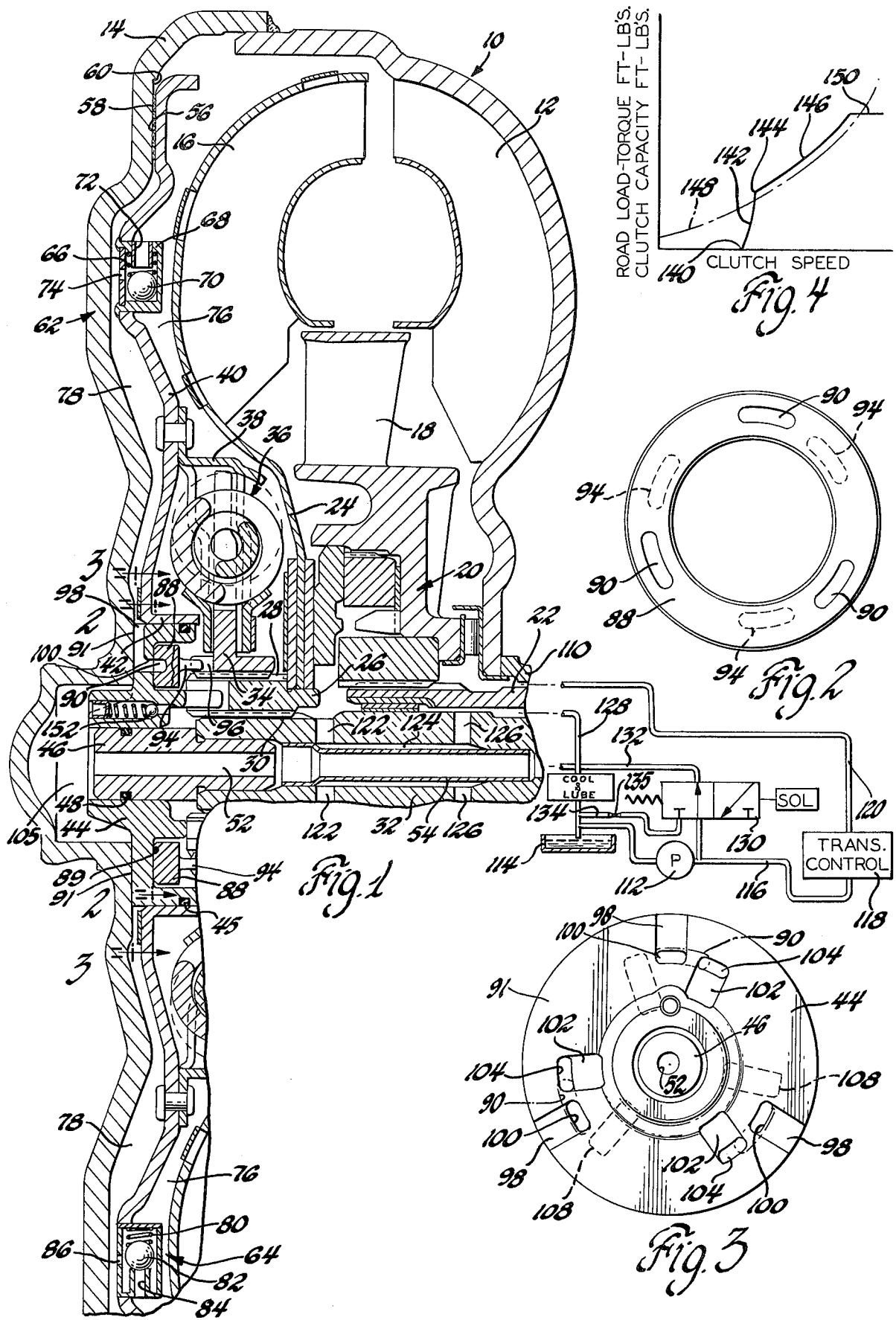

LOCK-UP CONVERTER CLUTCH WITH CENTRIFUGAL CONTROL VALVES

This invention relates to centrifugally responsive clutches and more particularly to centrifugally responsive fluid operated clutches.

It is an object of this invention to provide an improved torque converter and fluid operated centrifugally responsive lock-up clutch.

It is another object of this invention to provide an improved torque converter and fluid operated centrifugally responsive clutch wherein the clutch engagement force is controlled to permit slippage when the clutch speed is below a predetermined value and the clutch engagement force is controlled to be maintained at substantially the vehicle road load requirement when the clutch speed is above the predetermined value.

A further object of this invention is to provide an improved torque converter and fluid operated lock-up clutch wherein the engagement force is controlled during initial engagement by a normally open valve which closes in response to centrifugal force and during full engagement by a normally spring closed valve which is also urged closed by centrifugal force and opens in response to fluid pressure.

A still further object of this invention is to provide an improved torque converter and fluid operated single plate clutch wherein the clutch is disposed between the turbine and an input shell and wherein the engagement force of the clutch is controlled by two valves one of which is normally open to permit clutch slippage below a predetermined clutch speed and the other which is normally closed and controls the engagement force above the predetermined clutch speed to be substantially equal to the vehicle road load requirement and wherein both of the valves are urged toward the closed position by centrifugal force.

These and other objects and advantages of the present invention will be more apparent from the following description and drawings in which:

FIG. 1 is an elevational cross sectional view of a torque converter and clutch incorporating the present invention;

FIG. 2 is a view taken along line 2—2 of FIG. 1;

FIG. 3 is a view taken along line 3—3 of FIG. 1; and

FIG. 4 is a curve depicting the relationship between clutch speed, clutch capacity, and road load.

Referring to the drawings wherein like characters represent the same or corresponding parts there is shown in FIG. 1 a torque converter 10 having an impeller 12 which is welded or otherwise secured to an input shell 14. The torque converter 10 also includes a turbine member 16 and a stator member 18. The stator 18 is connected through a one way device 20 to a shaft 22 which is grounded to the transmission housing, not shown. The turbine 16 has an inner hub portion 24 which is secured to a drive transmitting member 26 which is splined on the outside diameter at 28 and the inside diameter at 30. The inner diameter spline 30 is drivingly connected with a torque converter output shaft 32 which may also be termed a transmission input shaft. The outer spline 28 is drivingly connected to a hub 34 which is a component of a vibration damper generally designated 36. The vibration damper 36 is preferably of conventional design and has an outer hub component 38 which is riveted or otherwise secured to a clutch pressure plate 40.

The clutch pressure plate 40 has an inner annular surface 42 which is slidably disposed on a hub 44 and the sliding surfaces are sealed from fluid leakage by a circular "O-ring" seal 45. The hub 44 is mounted on a plug member 46 which is secured to the torque converter output shaft 32. Leakage past the hub 44 and plug 46 is prevented by an "O-ring" seal 48. The plug 46 has an axial passage 52 which is aligned with a tubular member 54 secured in the shaft 32. The purpose of these passages will be discussed later.

The clutch plate 40 has an outer annular surface 56 to which is bonded an annular friction disc 58 which is adapted to frictionally engage an annular surface 60 formed on the input shell 14. As will be apparent from the structure shown if the friction surface 58 engages the annular surface 60 the clutch plate 40, damper 36, drive member 26 and output shaft 32 will be driven by the input member as will be turbine 16. As will be apparent to those skilled in the art this is a lock-up clutch which, when fully engaged, prevents internal slippage within the torque converter 10.

The clutch plate 40 has disposed therein one or more regulating valve assemblies, generally designated 62, and one or more regulating valve assemblies generally designated 64. The valve assembly 62 includes a spring member 66 disposed between a spring seat 68 and a ball 70. The spring 66 surrounds a tubular opening 72, which is in fluid communication with the fluid space between the turbine 16 and the clutch plate 40, and urges the ball 70 away from the opening 72. The side wall of the valve 62 has an opening 74 which is in fluid communication with the space between the clutch plate 40 and the input shell 14. The space between the turbine 16 and the clutch plate 40 is designated 76 and is termed the engagement chamber. The space between clutch plate 40 and input shell 14 is designated 78 and is termed the disengagement chamber.

The valve 64 is similar in construction with valve 62 having a spring 80 and a ball 82. However, the spring 80 urges the ball 82 against a tubular opening 84 such that the opening 84 is closed by the ball 82. The opening 84 is in fluid communication with the engagement chamber 76. A side wall of valve 64 has an opening 86 which is in fluid communication with the disengagement chamber 78. However, it will be appreciated from this disclosure the check valve is normally closed by the spring 80 to prevent normal fluid communication between chambers 76 and 78.

A coast release valve member 88 is disposed within the hub 44. This valve member 88 has a plurality of equally spaced arcuate slots 90 which are indented in face 89 of the valve 88, as can be seen in FIG. 1. The rearward face of valve 88, that is the face opposite to the slots 90, has formed thereon three equally spaced annular drive tangs 94 which are drivingly connected in complementary drive slots 96 formed in the inner hub 34 of the damper 36. Thus there is a driving connection between the damper 36 and the valve member 88.

The forward face of valve member 88 abuts an annular surface 89 of the hub 44. An annular surface 91 of hub 44 has formed therein a plurality of radial slots 98 which culminate in annular slots 100, which extend through the hub 44 to face 89, at a radius which permits alignment with the slots 90 in valve 88. Also formed in face 91 of the hub 44 are a plurality of radial slots 102 which terminate in arcuate slots 104 which extend through hub 44 to face 89. The slots 102 extend towards the inner radius of the hub 44 and the arcuate slots 104 are formed at a radius which also permits alignment with the slots 90. The rear face 89 of the hub 44 has formed therein a plurality of radial slots 108 which extend outwardly to a radius substantially equal to or slightly beyond the radius of slots 90.

In the position shown in FIG. 3 it will be appreciated that slot 98 is in fluid communication with the disengagement chamber 78, the slot 102 is in fluid communication with the slot 98 through openings 100, 90 and 104. The inner end of slot 102 is opened to the area 105 between the input shell 14 and the plug 46 such that fluid flow to slots 98, 100, 90, 104 and 102 will be available to flow through passage 52 and the passages connected thereto. This is the position which is assumed by the valve 88 when the clutch 40 is to be engaged. If a torque reversal occurs at the turbine, such as during coast, the turbine will advance relative to the clutch 40 due to backlash in the spline connection between hub 34 and member 26. When this occurs, the valve 88 will be moved relative to hub 44 such that slot 108 on the rear face 89 of hub 44 will be aligned with slot 90 such that the chamber 76 of clutch 40 will be communicated to the chamber 78 of clutch 40 thus interconnecting the engagement and disengagement chambers so the clutch will be disengaged on torque release or coasting of the vehicle. The relative movement necessary for the operation of coast valve 88 can be established through the lost motion spline drive between spline 28 and the splined inner hub 34 of the damper 36.

The impeller 12 has secured thereto a shaft 110 which is adapted to drive the pump shown schematically at 112. Such pump drives are well known in the torque converter and accordingly the structure is not shown. The pump 112 is preferably a conventional internal-external type gear pump which draws fluid from the transmission sump or reservoir 114 and delivers fluid via passage 116 to a conventional transmission control 118. As is well known in transmission controls, fluid pressure for the torque converter is directed via a passage 120 to the space between the stator 18 and the impeller 12 to feed fluid to the converter. Fluid from the converter is exhausted between the turbine 16 and the stator 18 through a radial passage 122 formed in shaft 32, axial passage 124 formed between shaft 32 and tubular member 54, radial passage 126 formed in the shaft 32 and a passage 128 which is connected to the transmission sump 114 through a cooler and lube system in a well known manner. Also included in the hydraulic control is a conventional two position three way valve shown schematically at 130. The valve 130 is preferably spring set in one position and solenoid or hydraulically operated to the other position. In the spring set position fluid in passage 116 is directed to a passage 132 through the tubular member 54 and passage 52 to the disengagement chamber 78. In the solenoid set position of valve 130 the fluid in passage 132, and therefore chamber 78, is connected to the transmission sump through a passage 134, which has a restriction 135 therein to control exhausting of chamber 78 while not affecting fluid flow to the chamber through passage 132. During normal operation fluid pressure circulating within the torque converter 10 also flows into the engagement chamber 76 to distribute fluid pressure on the rear face of clutch plate 40. With the valve 130 in the position shown, the fluid pressure on both sides of clutch plate 40 will be equal and the clutch plate will be substantially disengaged. If the valve 130 is moved to the solenoid set position, the disengagement chamber 78 will be exhausted through restriction 135, and fluid pressure in engagement chamber 76 will pass through valve 62 to the disengagement chamber 78. If the fluid flow through the valve 62 is sufficiently greater than the flow requirement of restriction 135, the pressure differential across clutch 40 will be such that the clutch will remain substantially disengaged.

Assuming that the vehicle is operating in third gear and the valve 130 is positioned to the solenoid set position, fluid flow through the valve 62 will maintain the clutch disengaged until the centrifugal force acting on valve 70 causes the valve to overcome the force of spring 66 to begin to close the tubular member 72. The clutch speed at which this will occur is shown at 140 in FIG. 4. At this point the valve 62 begins to regulate the differential pressure across the clutch plate 40 and causes the clutch plate to be engaged with a capacity which follows the curve 142 shown in FIG. 4. At point 144 on the curve, the valve 64 begins to open due to the pressure in the engagement chamber 76 of the clutch 40 which, at this point, produces a force on valve 64 which is greater than the centrifugal force on ball 82, the force in spring 80 and the force due to the pressure in the disengagement chamber 78 so that the clutch engagement force is regulated from point 144 for increasing speeds along line 146 by valve 64. The shape of curves 142 and 146 is controlled by the mass of the balls 70 and 82, springs 66 and 80, and diameters of tubes 72 and 84. Assuming the springs and tubes are equal, the mass of these balls is designed such that the ball 70 has a greater mass than the ball 82 and therefore has a higher closing force at all clutch speeds. It should be recognized that the spring forces and tube diameter can also be varied to provide design flexibility. However, the spring 80 assists in closing ball 82, so that the minimum opening pressure is controlled. Also shown in FIG. 4 is the typical vehicle road load curve 148, which as can be seen is slightly less than the curve 146 such that the clutch will remain engaged for road load speeds above the speed represented by point 144. At torques above those shown on curves 142, 146 and 150, the clutch will be in slipping engagement while at torques below these curves the clutch will not slip.

It will be noticed that the upper end of curve 146 has a flat portion 150. This flat portion is controlled by regulating valve 152 which is disposed in the hub 44. This valve 152 is spring loaded, closed and is in fluid communication with the chamber 76. Valve 152 permits the upper torque limit of the clutch to be controlled because; when the pressure differential between 76 and 78 is sufficiently great, the valve 152 will open to prevent any further increase in pressure differential thus establishing the upper limit of the clutch capacity. It is not necessary that the clutch have an upper limit for proper operation, however in many instances it is desirable.

Obviously, many modifications and variations are possible in light of the above teaching. It is, therefore, to be understood that within the scope of the appended claims the invention may be practiced otherwise than is specifically described.

What is claimed is:

1. A torque converter and lock-up clutch for a vehicle drive comprising; an input member; an impeller secured to said input member, a turbine in fluid communication with said impeller and being disposed between said impeller and input member; a stator in fluid communication with said impeller and turbine and being disposed therebetween; a fluid operated clutch disposed between said turbine and said input member and being drivingly connected to said turbine; a clutch engagement chamber formed by said turbine and said clutch adapted to be pressurized by fluid from said torque converter to engage said clutch; a clutch disengagement chamber formed between said input member and said clutch adapted to be pressurized by fluid from said clutch engagement chamber to disengage said clutch; wherein the improvement comprises; a two stage centrifugally responsive clutch control having a first normally open centrifugally responsive valve means disposed on said clutch for providing a controlled fluid flow path from said clutch engagement chamber to said clutch disengagement chamber when the clutch speed is below a predetermined value, thereby controlling the pressure differential between said clutch chambers so that the engagement force of said clutch is controlled, and a second normally closed centrifugally responsive valve means disposed on said clutch for providing a controlled flow path from said clutch engagement chamber to said clutch disengagement chamber so that the engagement force of said clutch is controlled by the pressure differential of said clutch chambers when the clutch speed is equal to or greater than said predetermined value, said first valve means being operable to provide a pressure differential between said clutch chambers that will maintain the clutch disengaged over a predetermined clutch speed range below said predetermined value and provide a rapidly increasing pressure differential between said clutch chambers to control the clutch engagement force and clutch torque capacity at a level below the vehicle road load requirement when the clutch speed is between the highest speed of said predetermined range and said predetermined value, said second valve means being operable to provide a pressure differential between said clutch chambers that will maintain the clutch engagement force and clutch torque capacity substantially equal to the vehicle road load requirement when the clutch speed is at or above said predetermined value.

2. A torque converter and lock-up clutch comprising; an input member; an impeller secured to said input member, a turbine in fluid communication with said impeller and being disposed between said impeller and input member; a stator in fluid communication with said impeller and turbine and being disposed therebetween; a fluid operated clutch disposed between said turbine and said input member and being drivingly connected to said turbine; a clutch engagement chamber formed by said turbine and said clutch; a clutch disengagement chamber formed between said input member and said clutch; a first normally open centrifugally responsive valve means disposed on said clutch for providing a controlled flow path between said engagement and disengagement chambers in response to clutch speed for controlling the pressure differential therebetween and thereby controlling the engagement force of said clutch with said input member when the clutch speed is less than a predetermined value; and a second normally closed centrifugally responsive valve means disposed on said clutch for providing a controlled flow path between said engagement and disengagement chambers in response to the speed of said clutch and the pressure differential of said chambers for controlling the engagement force of said clutch when speed of said clutch is equal to or greater than said predetermined speed.

* * * * *